Figure 1:
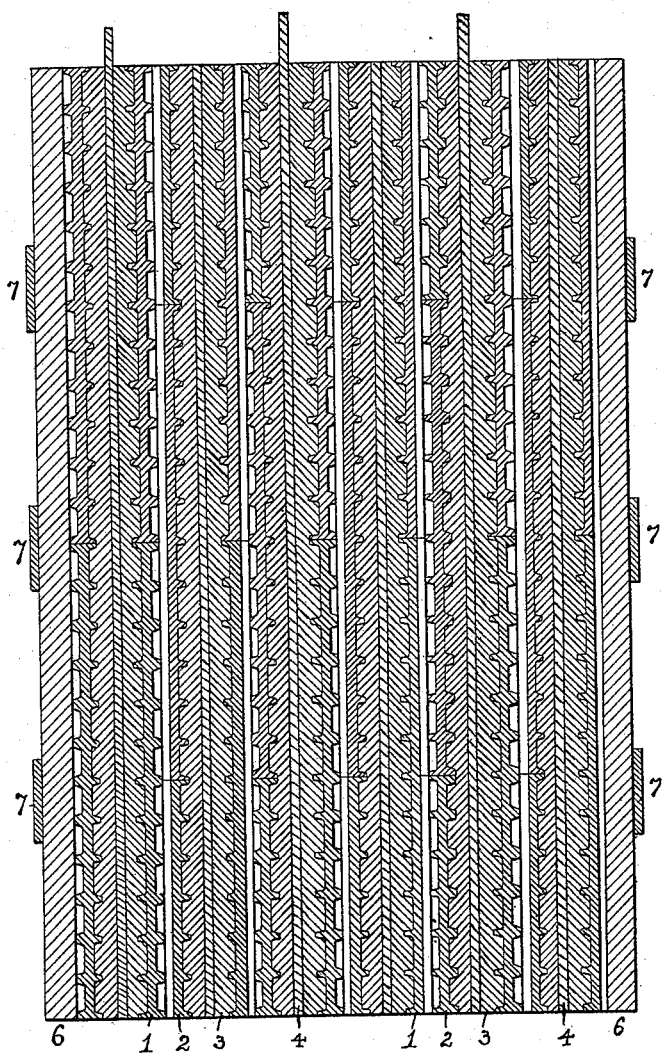

(No Model.)  2 Sheets—Sheet 1.
G. E. HATCH.
SECONDARY BATTERY.

No. 585,473. Patented June 29, 1897.

Witnesses:
F. D. Goodwin
Will. A. Barr.

Inventor:
George E. Hatch
by his Attorneys
Howson & Howson

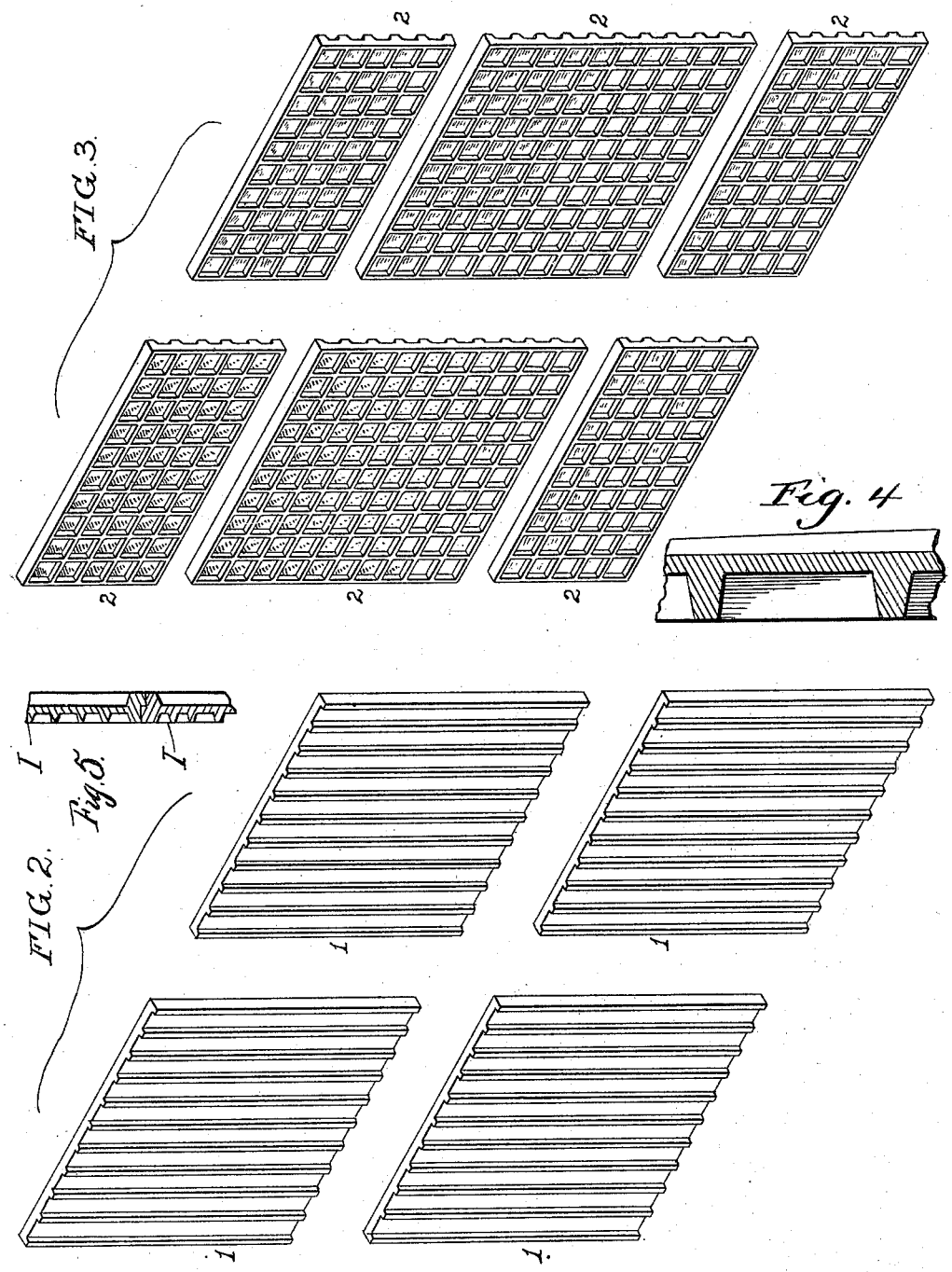

UNITED STATES PATENT OFFICE.

GEORGE E. HATCH, OF QUINCY, MASSACHUSETTS, ASSIGNOR OF THREE-FOURTHS TO JAMES P. CLARE, OF SAME PLACE, AND JACOB E. RIDGWAY, OF PHILADELPHIA, PENNSYLVANIA.

SECONDARY BATTERY.

SPECIFICATION forming part of Letters Patent No. 585,473, dated June 29, 1897.

Application filed April 28, 1896. Renewed March 11, 1897. Serial No. 627,043. (No model.)

*To all whom it may concern:*

Be it known that I, GEORGE E. HATCH, a citizen of the United States, and a resident of Quincy, Massachusetts, have invented certain Improvements in Secondary Batteries, of which the following is a specification.

My invention consists of certain improvements in that class of secondary storage batteries represented in my Patent No. 441,413, dated November 25, 1890—that is to say, those in which the active material is applied to the face of a porous plate, whereby said active material is supported in contact with the electrode.

One object of my present invention is to provide for the manufacture of batteries of this class of large size without unduly increasing the bulk, weight, or cost of the porous terra-cotta supporting-plates, a further object being to render the battery self-accommodating to irregularities of expansion or contraction of the active material or to such buckling of the electrode as may take place, and a still further object being to provide for the use of sectional terra-cotta supporting-plates without risk of forming electrical connections from one element of the battery to the next. These objects I attain in the manner hereinafter set forth, reference being had to the accompanying drawings, in which—

Figure 1 is a vertical sectional view of a secondary battery constructed in accordance with my present invention. Fig. 2 is a perspective view looking at the back of one of the sectional terra-cotta supporting-plates of the battery and showing the sections of the plate separated from each other. Fig. 3 is a perspective view looking at the face of the adjoining plate and also showing the sections of the plate separated from each other; and Fig. 4 is a sectional plan view, on an enlarged scale, of part of one of the supporting-plates of the battery. Fig. 5 is a detail view of a modified form of joint.

The battery is composed of successive pairs of supports 1 and 2 for the active material 3, this active material being applied to the adjoining faces of the supports 1 and 2 of each pair and being held thereby in electrical contact with the conductor or electrode 4 of the element, which may be a thin plate of lead or any other available form of conductor, the conductors being alternately positive and negative and being connected up to suitable terminals in the ordinary manner. That face of each of the supports which receives the active material is of cellular form or is pitted, grooved, roughened, or otherwise constructed, so as to properly receive and retain said active material, and the back of each support is preferably ribbed, so as to form, between it and the back of the adjacent support, channels or passages for the entrance or circulation of the electrolyte in order that the latter may gain access to the entire rear surface of each support. Any suitable separating medium may, however, be used in place of the ribs as a means of separating the supports from each other.

Each of the supports 1 and 2 is composed of a number of small plates of terra-cotta or other porous earthenware disposed edge to edge, the object in making the supports in sections being to permit of the molding and burning of very thin plates without risk of breaking, warping, or other distortion due to the burning of the plates and to the handling of the same before they are burned. The sectional plates, as shown in the drawings, are formed with bearing-surfaces between the separate plates of greater width than the average thickness of the plates.

The small plates can be extremely thin and yet will, when molded and burned, be perfectly flat, and they can, moreover, be molded upon the ordinary machinery employed in terra-cotta manufacture, so that the bulk, cost, and weight of the supports for the active material can be reduced to a minimum.

The different sections of the support, moreover, are free to move independently of each other, so as to accommodate irregularity of expansion or contraction of the active material and such buckling or warping of the conducting-electrode as may take place.

It will be observed on reference to Fig. 1 that the horizontal joints between the plates or sections of the supports 1 are out of line with the horizontal joints between the sections or plates of the supports 2, the object of this construction being to prevent the formation of a conducting-body from one element of the battery to the next, which might, if the horizontal joints of one support were in line with those of the adjacent support, be formed by active material which had not been removed from the edges of the plates preparatory to fitting them together.

The plates may be so disposed as to break joints vertically as well as horizontally, if desired, by making the joints rabbeted, as shown in Fig. 5; but this is not so important, as active material is not likely to accumulate upon the vertical edges of the plates. Instead of having plain butt-joints the plates may be rabbeted at the edge, if desired.

The end supports of the battery are flanked by plates 6, preferably of wood treated so as to render it acid-proof, and the whole is bound together by means of elastic bands 7, so as to retain the parts in proper relation to each other, but permit expansion and contraction.

Having thus described my invention, I claim and desire to secure by Letters Patent—

1. A secondary battery consisting of one or more pairs of supports, the inner faces of which are provided with pockets and to which the active material is applied and by which it is sustained in contact with the interposed conducting-electrode, each of said supports being composed of a number of plates of stiff porous earthenware disposed edge to edge, bearing-surfaces being formed between the separate plates of greater width than the average thickness of the plates, substantially as specified.

2. A secondary battery consisting of one or more pairs of supports, the rear faces of which are provided with projecting ribs and their inner faces with pockets to which supports the active material is applied and by which it is sustained by contact with the interposed conducting-electrode, each of said supports being composed of a number of plates of stiff porous earthenware disposed edge to edge, bearing-surfaces being formed between the separate plates of greater width than the average thickness of the plates, substantially as specified.

3. A secondary battery in which are combined a series of pairs of supports each having active material applied to its inner face and sustained thereby in contact with the interposed conducting-electrode, each of said supports being composed of a number of stiff porous earthenware plates disposed edge to edge, the horizontal joints between the plates of one support being out of line with the horizontal joints between the plates of the adjacent support, substantially as specified.

In testimony whereof I have signed my name to this specification in the presence of two subscribing witnesses.

GEO. E. HATCH.

Witnesses:
FRANK E. BECHTOLD,
JOS. H. KLEIN.